(12) United States Patent
Kaufmann et al.

(10) Patent No.: US 8,695,358 B2
(45) Date of Patent: Apr. 15, 2014

(54) SWITCHGEAR HAVING EVAPORATIVE COOLING APPARATUS

(75) Inventors: Patrik Kaufmann, Baden (CH); Tilo Buehler, Wettingen (CH); Harshavardhan M. Karankikar, Longwood, FL (US); Rahul Pawar, Lake Mary, FL (US); Jerry Earl, DeLand, FL (US); Gabriel Schuler, Knonau (CH)

(73) Assignee: ABB Research Ltd., Zurich (CH)

( * ) Notice: Subject to any disclaimer, the term of this patent is extended or adjusted under 35 U.S.C. 154(b) by 167 days.

(21) Appl. No.: 13/444,888

(22) Filed: Apr. 12, 2012

(65) Prior Publication Data

US 2012/0297798 A1 Nov. 29, 2012

Related U.S. Application Data

(60) Provisional application No. 61/488,919, filed on May 23, 2011.

(51) Int. Cl.
*F25D 25/00* (2006.01)

(52) U.S. Cl.
USPC .............................................. 62/62; 62/259.2

(58) Field of Classification Search
CPC ............................... F25D 25/00; F25B 31/006
USPC ..................... 62/62, 259.2; 165/80.4, 104.33; 361/699
See application file for complete search history.

(56) References Cited

U.S. PATENT DOCUMENTS

| | | | |
|---|---|---|---|
| 3,662,137 A * | 5/1972 | Cleaveland | ................... 200/289 |
| 3,728,585 A | 4/1973 | Olashaw | |
| 3,764,765 A | 10/1973 | Olashaw | |
| 3,769,511 A | 10/1973 | Delacy | |
| 3,769,551 A | 10/1973 | Corman | |
| 3,802,869 A * | 4/1974 | Duane et al. | ................... 75/384 |
| 4,321,422 A | 3/1982 | Rogers | |

(Continued)

FOREIGN PATENT DOCUMENTS

| | | |
|---|---|---|
| DE | 3941388 A1 | 6/1991 |
| DE | 19715178 A1 | 10/1998 |
| DE | 102005011405 B3 | 11/2006 |
| DE | 102009023866 A1 | 12/2010 |
| EP | 1995840 A1 | 11/2008 |

(Continued)

OTHER PUBLICATIONS

International Search Report & Written Opinion in PCT/US2012/036042 dated Sep. 19, 2012.

(Continued)

*Primary Examiner* — Mohammad M Ali
(74) *Attorney, Agent, or Firm* — Robert P. Nupp; Manelli Selter PLLC; Edward J. Stemberger

(57) ABSTRACT

A cooling apparatus for cooling a switchgear is provided. The switchgear has one or more primary contacts supported by a bushing and constructed and arranged to connect to a terminal of a circuit breaker. The cooling apparatus includes at least one evaporator associated with each primary contact, a condenser apparatus located at a higher elevation than the at least one evaporator, fluid conduit structure connecting the at least one evaporator with the condenser apparatus, and electrically insulating working fluid in at least one evaporator so as to be heated to a vapor state, with the fluid conduit structure being constructed and arranged to transfer the vapor to the condenser apparatus and to passively return condensed working fluid back to the at least one evaporator.

26 Claims, 11 Drawing Sheets

(56) References Cited

U.S. PATENT DOCUMENTS

| | | | | |
|---|---|---|---|---|
| 4,964,279 | A * | 10/1990 | Osborne | 62/59 |
| 6,422,018 | B1 * | 7/2002 | Tisdale et al. | 60/728 |
| 6,553,770 | B2 * | 4/2003 | Tisdale et al. | 60/772 |
| 6,978,828 | B1 | 12/2005 | Gunawardana | |
| 7,140,197 | B2 * | 11/2006 | Chordia et al. | 62/401 |
| 7,162,886 | B2 * | 1/2007 | Maul | 62/259.2 |
| 7,437,887 | B2 * | 10/2008 | Hinder et al. | 62/498 |
| 2006/0060333 | A1 * | 3/2006 | Chordia et al. | 165/104.33 |
| 2010/0302715 | A1 | 12/2010 | Bortoli et al. | |

FOREIGN PATENT DOCUMENTS

| | | |
|---|---|---|
| EP | 2256767 A2 | 12/2010 |
| EP | 22800460 | 2/2011 |
| JP | 6162827 A | 6/1994 |
| JP | 52143488 A | 11/1997 |
| JP | 2004080972 A | 3/2004 |

OTHER PUBLICATIONS

Partial International Search Report in PCT/US2012/036042 dated Jul. 25, 2012.

* cited by examiner

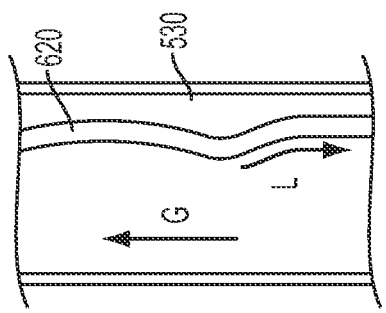
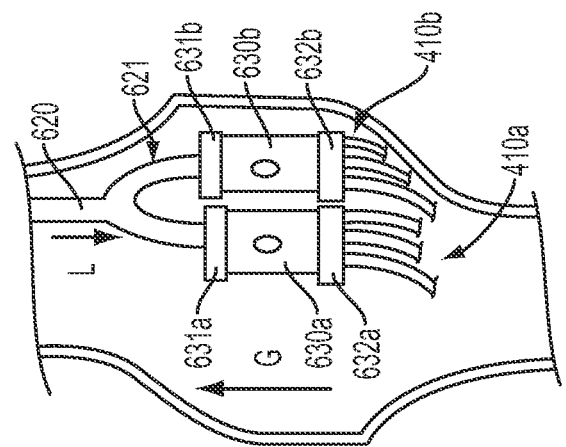
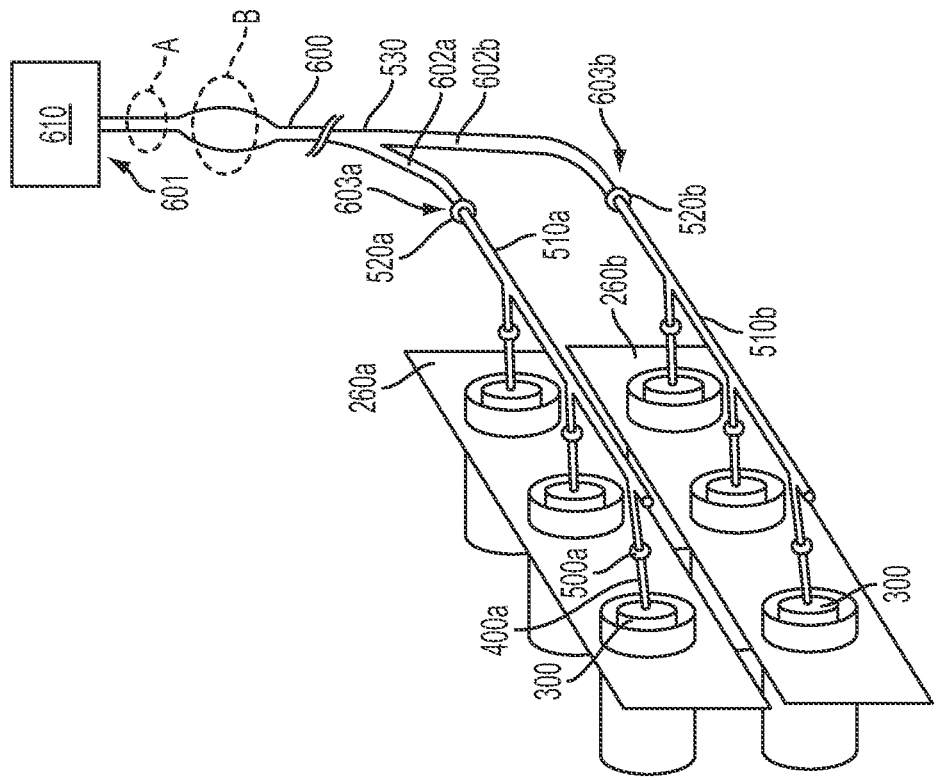

SWITCHGEAR HAVING EVAPORATIVE COOLING APPARATUS

This application claims the priority benefit of the earlier filing date of U.S. Provisional Application No. 61/488,919, filed on May 23, 2011, which is incorporated by reference herein in its entirety.

FIELD

The present invention is directed to medium and high voltage switchgear with a cooling apparatus. In particular, it is directed to an evaporative cooling apparatus including a primary contact having an integral evaporator chamber.

BACKGROUND

In general, it is a design challenge to achieve high continuous current ratings for medium and high voltage switchgear at a reasonable cost. Continuous current rating is governed by the heat rise within the switchgear conductors. High current flow in switchgear conductors generates heat. At specific points in the current path, e.g., the primary bushing contacts, hot spots occur due to localized high resistance.

It is generally desired to limit the maximum temperature of the hottest spot on the switchgear bus system to 105° C. (a rise of 65° C. over an assumed ambient temperature of 40° C.), as directed by the standard IEEE 37.20.2. Typical medium and high-voltage metal-clad switchgear arrangements have maximum continuous current ratings of about 3000 A, due to heat generation. It is desirable to increase this current rating. As may be appreciated, it may also be desirable to manipulate different switchgear parameters, such as conductor cross-section or switchgear size, using cooling without concern for increasing maximum current rating.

It is possible to deal with hot spots and thereby reach higher continuous current ratings by a number of means—for example by increasing cross section of the current carrying bus, by increasing the size of the switchgear compartments, etc. One common solution is to use forced air cooling with fans mounted in every third or fourth switchgear frame. The former solutions generally result in unacceptable cost and/or size of the switchgear enclosure. The latter solution is not practical in many cases, including in the case of arc-resistant switchgear, since the byproducts of an arc fault must be contained within the switchgear.

Thus, there is a need to provide an effective passive cooling arrangement for a switchgear.

SUMMARY

An object of the invention is to fulfill the need referred to above. In accordance with an embodiment of the present invention, this objective is achieved by providing a cooling apparatus for a switchgear. The switchgear includes one or more primary contacts supported by a bushing and constructed and arranged to connect to a terminal of a circuit breaker. The cooling apparatus includes at least one evaporator associated with each primary contact, a condenser apparatus located at a higher elevation than the at least one evaporator, fluid conduit structure connecting the at least one evaporation to the condenser apparatus, and electrically insulating working fluid in the at least one evaporator so as to be heated to a vapor state, with the fluid conduit structure being constructed and arranged to transfer the vapor to the condenser apparatus and to passively return condensed working fluid back to the at least one evaporator.

In accordance with another aspect of the invention, a method of cooling a switchgear is provided. The switchgear has primary contacts constructed and arranged to connect to a terminal of a circuit breaker. The method associates an evaporator with each primary contact. A condenser is located at a higher elevation than each evaporator. Fluid conduit structure fluidly connects the evaporators with the condenser and a working fluid is provided in each evaporator. Heat is transferred from the primary contacts to the working fluid to cause the working fluid to evaporate in the evaporators, with the evaporated vapor being delivered to the condenser via the fluid conduit structure. The working fluid that condenses in the condenser is passively returned to the evaporators via the fluid conduit structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

In the accompanying drawings, structural embodiments are illustrated that, together with the detailed description provided below, describe exemplary embodiments of medium voltage switchgear having an evaporative cooling apparatus. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

FIG. 3A is an isometric view of a bushing plate and primary contacts. The

FIG. 6A is a perspective view of an upper and lower bushing plate assembly and associated fluid conduit and condenser apparatus.

FIG. 6B is an enlarged cross-sectional view of the portion of the fluid conduit shown in the dashed line A of FIG. 6A, showing a portion of the nested upper flow separation hose.

FIG. 6C is an enlarged cross-sectional view of the portion of the fluid conduit shown in the dashed line B of FIG. 6A, showing two nested splitters and associated flow separation hoses.

DETAILED DESCRIPTION OF EXEMPLARY EMBODIMENTS

Increasing the continuous current flow in switchgear results in increased heat generation in the conductive elements. In particular, a critical spot for temperature rise in switchgear is the region including the interface between the primary bushing and primary contacts (described below) referred to hereinafter simply as the primary bushing interface.

Figure 1:
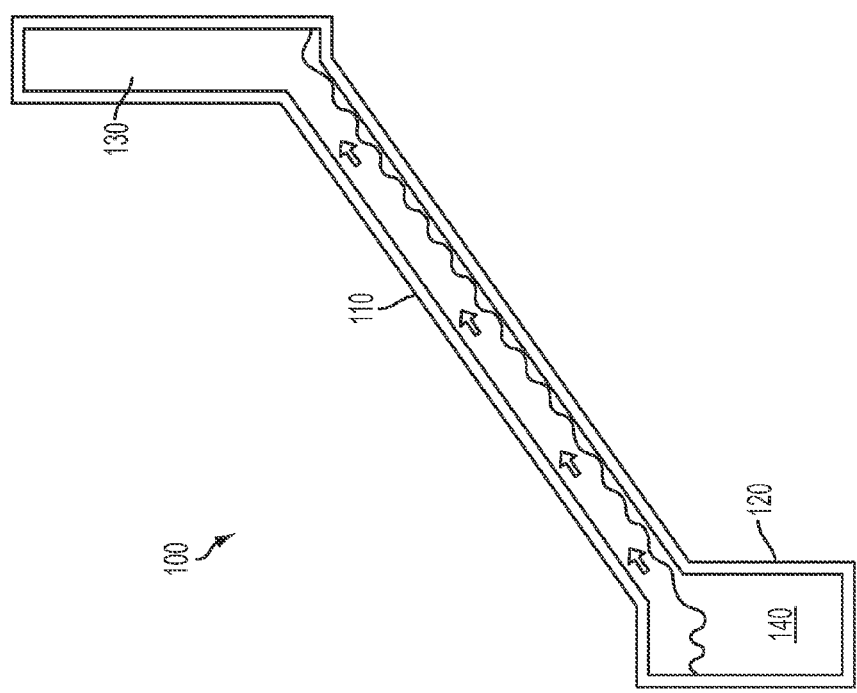
FIG. 1 is a cross-sectional elevation view of a common heat pipe apparatus.

An evaporative cooling system, in general, may comprise a heat pipe. A heat pipe operates to cool a first location by transporting heat from the first location to a second location via the use of a working fluid. Referring to FIG. 1, a common arrangement for a heat pipe 100 is illustrated. Heat pipe 100 comprises a fluid conduit structure 110 that connects evaporator 120 to condenser 130, at opposite ends thereof. Working fluid 140 resides in heat pipe 100. In operation, evaporator 120 is placed in thermal contact with a first location to be cooled. Heat from the first location causes working fluid 140 to evaporate, primarily at evaporator 120. Thereafter, working fluid 140 (in a gaseous state) travels upstream to condenser 130, where the heat is released as a substantial portion of the evaporated working fluid condenses back to a liquid state (although some condensation and evaporation may also occur in the fluid conduit structure). The condensed (i.e., liquid) working fluid then travels downstream toward evaporator 120 to complete a cycle.

Heat pipe 100 is advantageously in the form of a thermosiphon—a term connoting that condensed working fluid is transported from the condenser to the evaporator primarily by operation of gravity. As such, in a thermosiphon generally, the condenser is arranged at a higher elevation (in the gravitational field) than the evaporator, and a drop should be present along the heat pipe between the condenser and the evaporator.

Figure 2:
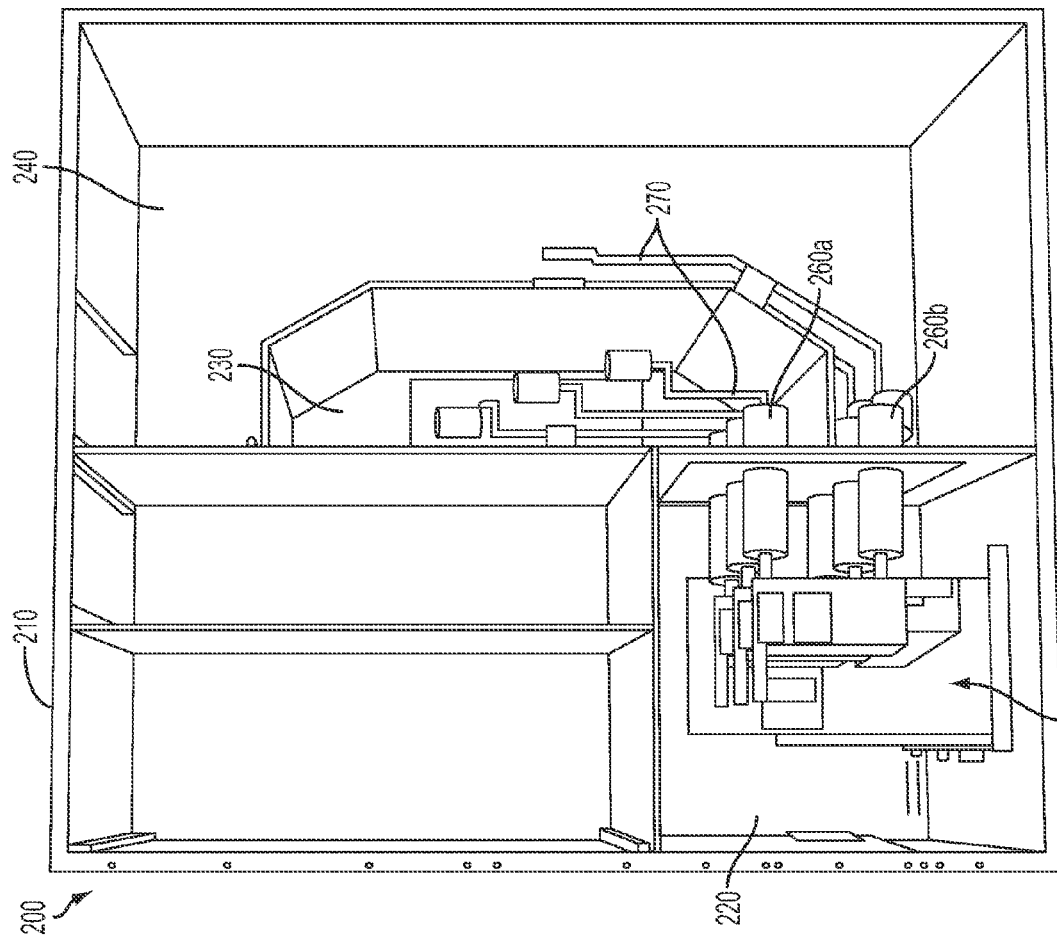
FIG. 2 is a cross-sectional elevation view of an arc-resistant medium voltage switchgear assembly.

As previously noted, it is desirable to achieve high continuous current ratings for medium and high voltage switchgear. With reference to FIG. 2, one non-limiting example of medium voltage switchgear 200 is shown. As used herein, the terms "medium voltage switchgear" and "high voltage switchgear" are used interchangeably, and refer to switchgear rated for operation at or exceeding 1 kV. In general, switchgear 200 comprises an enclosure, such as metal-clad enclosure 210, for housing the switchgear components. Enclosure 210 may contain one or more separate compartments, such as circuit breaker compartment 220, main bus compartment 230, and cable compartment 240. Switchgear 200 contains one or more circuit breakers 250. In the embodiment shown, circuit breaker 250 is a three-pole drawout type circuit breaker. Circuit breaker 250 is connected to primary contacts (described below) that are supported by primary bushing plates 260a,b and that are connected to current-carrying bus bars 270.

Figure 3A:
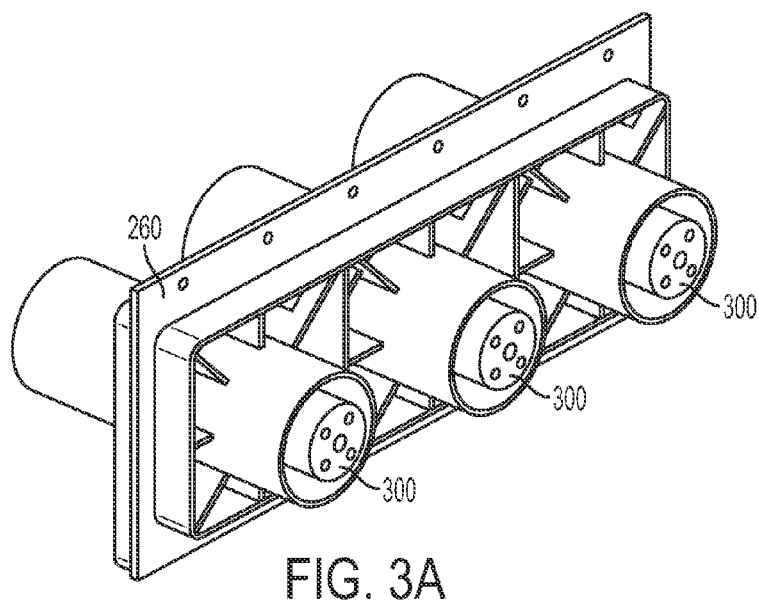

With reference to FIG. 3A, primary contacts 300 are shown fixedly seated in bushing plate 260. Typically, bushing plate 260 comprises a glass reinforced polyester, porcelain, or epoxy material, and is configured to support the weight of the contact and preferably auxiliary hardware, such as current transformers (not shown). In the embodiment shown, bushing plate 260 is a plate arrangement that is configured to be affixed to a compartment wall of switchgear 200, and that holds three primary contacts (one for each pole). As may be appreciated, however, other bushing configurations may be utilized herein, including single bushing assembly (one for each primary contact). In operation in the switchgear embodiment of the type shown in FIG. 2, two bushing plates 260 are stacked and affixed to a compartment wall of switchgear 200, providing six primary contacts (two per pole) adjacent circuit breaker 250, for attachment thereto.

Figure 3B:
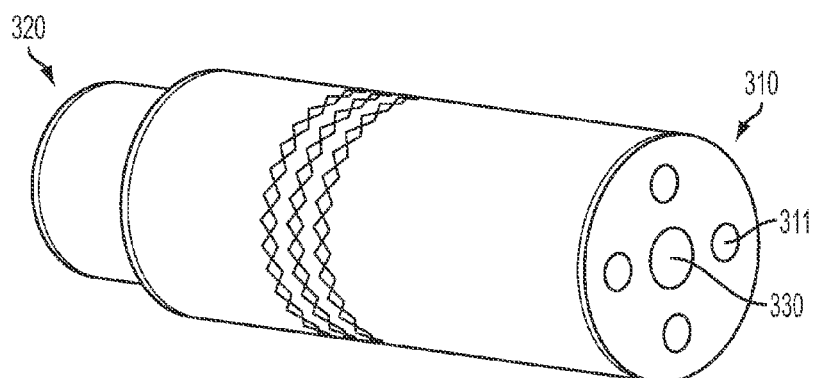
FIG. 3B is a perspective view of a primary contact.
Figure 3C:
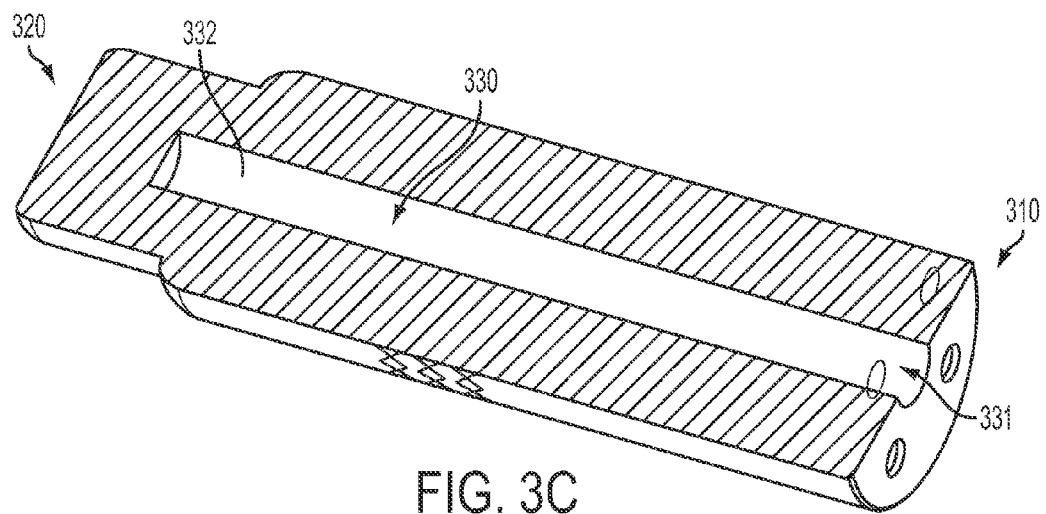
FIG. 3C is a cross-sectional perspective view of the primary contact of FIG. 3B.

With reference to FIGS. 3B and 3C, primary contact 300 is any stationary contact for engagement with a circuit breaker, and may be made of any suitable conductor and may have any suitable configuration. In one non-limiting embodiment, primary contact 300 is made of silver-plated copper and has a first end 310 that is configured to connect to a primary bus bar (not shown) via bolt holes 311 and a second end 320 that is designed to accept round, tulip-style connectors. Unless otherwise indicated to the contrary, as used herein, the term "end" connotes and is inclusive of an area or portion proximate an endpoint.

In one non-limiting embodiment of the present invention, the evaporator 120 comprises one or more evaporator chambers 330 that are integral to the primary contacts 300. Evaporator chamber 330 is generally a longitudinal cavity or chamber having a first end 331 that comprises an aperture that is adapted to be in fluid connection with a fluid conduit component and a second end 332 that is closed. In one non-limiting embodiment, first end 331 is threaded and second end 332 is a dead-end hole. As used herein, "fluid conduit structure" generally connotes a single conduit component (e.g., hose, tubing, piping, and the like) or network of sealably connected conduit components that carries the working fluid (described below), either in a condensed state or an evaporated state, between evaporator chamber 330 and a condenser apparatus (described below), and that contains within it, in a nested relationship, a flow separation tube or tubing network (described below).

In the non-limiting embodiment shown, evaporator chamber 330 has a circular cross-section that is centered on the longitudinal axis of primary contact 300, and that extends substantially along the entire length of primary contact 300. However, it may be appreciated that a wide range of evaporator chamber configurations may accomplish sufficient cooling of the primary contact and bushing interface, depending on (for example) the configuration and makeup of the primary contact and bushings, and the like, all of which are encompassed herein. For example, in one embodiment, evaporator chamber 330 is a longitudinal chamber having a first circular cross-section over a first portion and a second circular cross-section over a second portion proximate the second end 332, where the second cross-section has a larger radius than the first cross-section, thereby forming an enlarged chamber portion proximate second end 332.

Figure 3D:
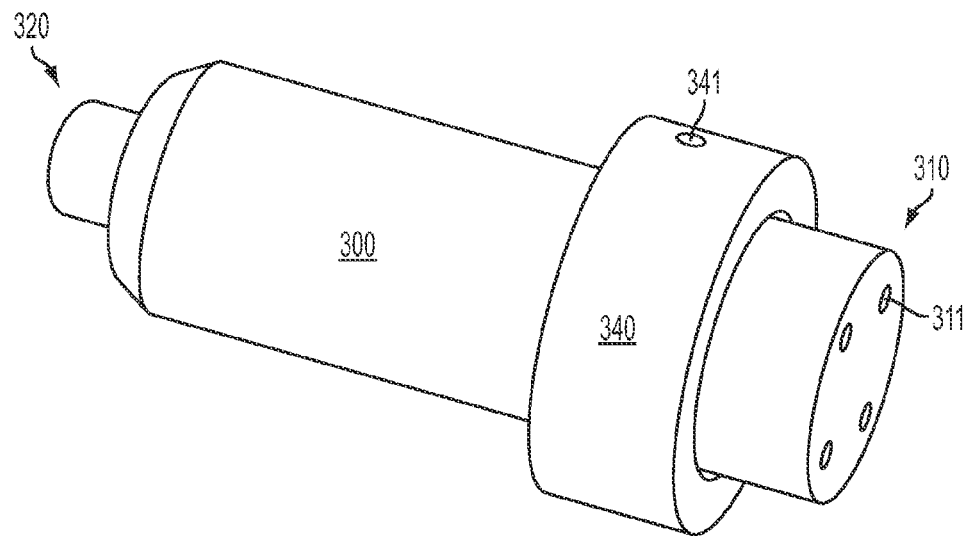
FIG. 3D is a perspective view of a primary contact and an attached "ring" evaporator.

In another non-limiting embodiment of the present invention, the evaporator comprises one or more external evaporator compartments that are thermally and mechanically connected to the primary contacts—hereinafter referred to as an "attached evaporator." In general, an attached evaporator is suitable for use herein if it is has sufficient thermal and mechanical connection to a primary contact; if it has sufficient cross-sectional area that is in thermal contact with the primary contact; and if it has a sufficient interior volume for receiving working fluid and any flow separation and equilibrium tubing components that may be utilized in the particular embodiment. FIG. 3D shows one non-limiting example of an attached evaporator 340 suitable for use in the present invention. As shown, attached evaporator 340 is a hollow annular cylinder that surrounds primary contact 300 and is mechanically attached thereto and in thermal contact therewith. Attached evaporator 340 has an aperture 341 that is adapted to be in fluid connection with a fluid conduit component, such as an extension tube, described in more detail below. In one embodiment, attached evaporator 340 is made from copper or aluminum.

Figure 3E:
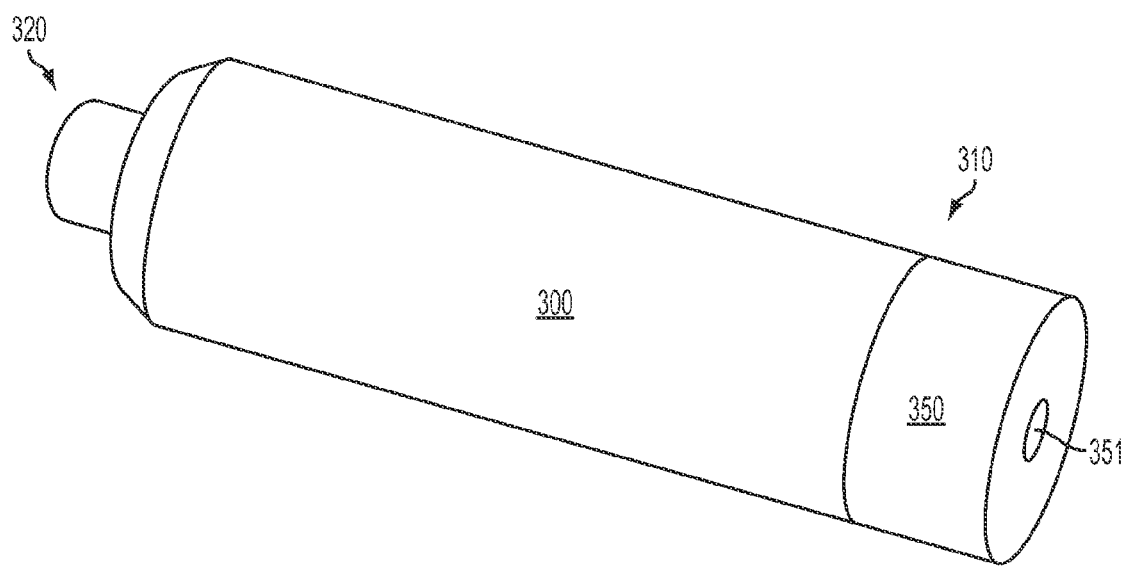
FIG. 3E is a perspective view of a primary contact and an attached "cap" evaporator.

In FIG. 3E, another non-limiting example of an attached evaporator suitable for use in the present invention is shown. Attached evaporator 350 is a hollow cylindrical cap that is mechanically affixed to first end 310 of primary contact 330, such that working fluid contacts first end 310. Evaporator 350 has an aperture 351 that is adapted to be in fluid connection with a fluid conduit component, such as an extension tube, described in more detail below. In one or more embodiments, one or more primary bus bars (not shown) pass through the cylindrical sidewall of evaporator 350, via sealable pass-through means (e.g., bushing) (not shown), such that the bus bars may be connected to the first end 310 of primary bus bar 300. In one embodiment, attached evaporator 340 is made from copper or aluminum.

Figure 4A:
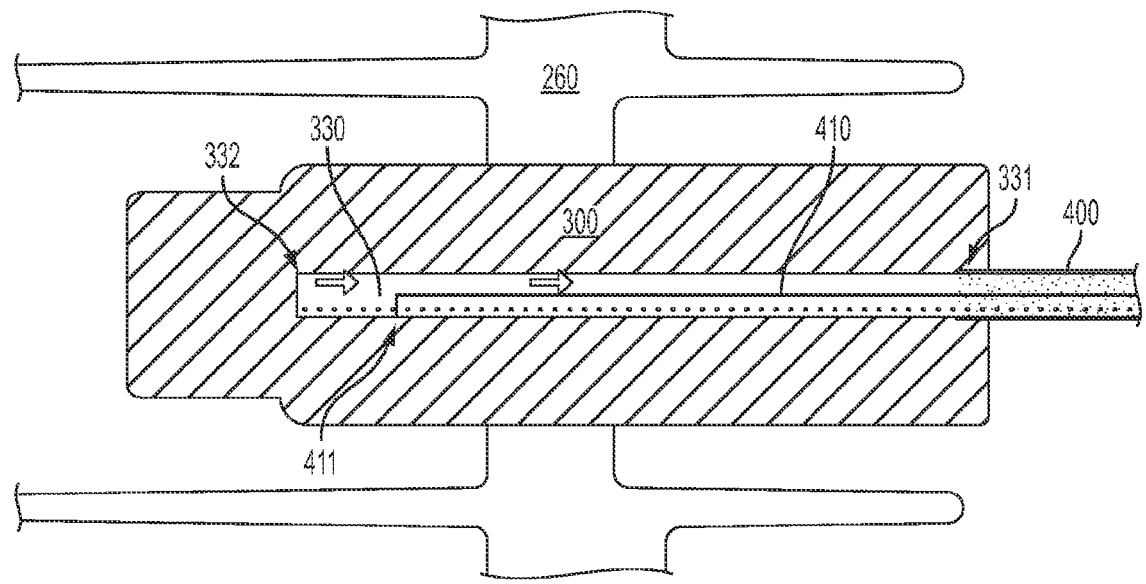
FIG. 4A is a cross-sectional elevation view of one embodiment of a primary contact and support bushing, showing an evaporator chamber and a portion of a terminal flow separation tube.
Figure 4B:
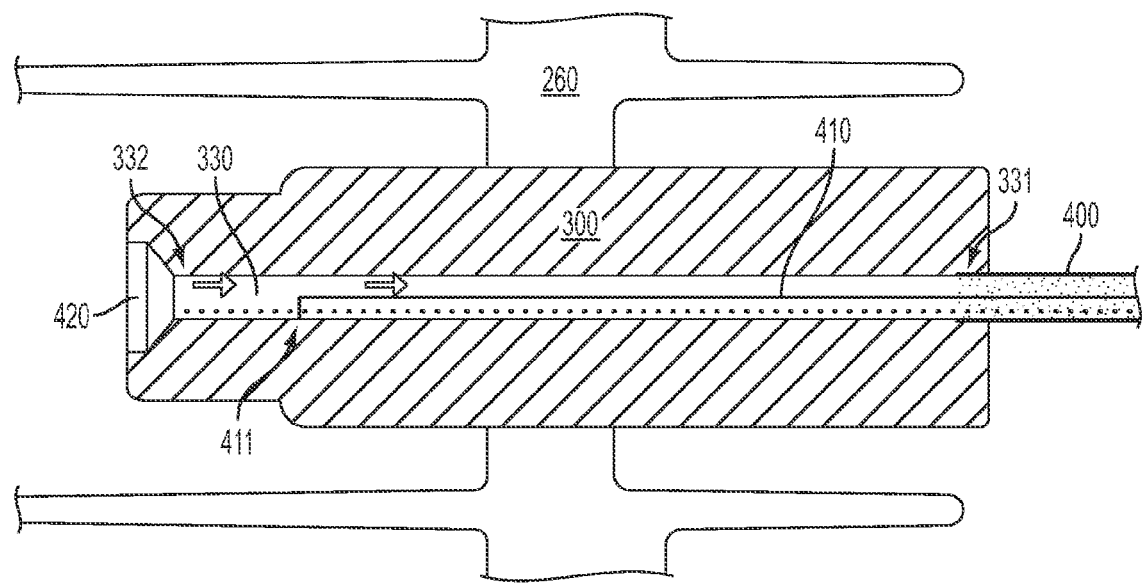
FIG. 4B is a cross-sectional elevation view of a second embodiment of a primary contact and support bushing, showing an evaporator chamber and a portion of a terminal flow separation tube.
Figure 4C:
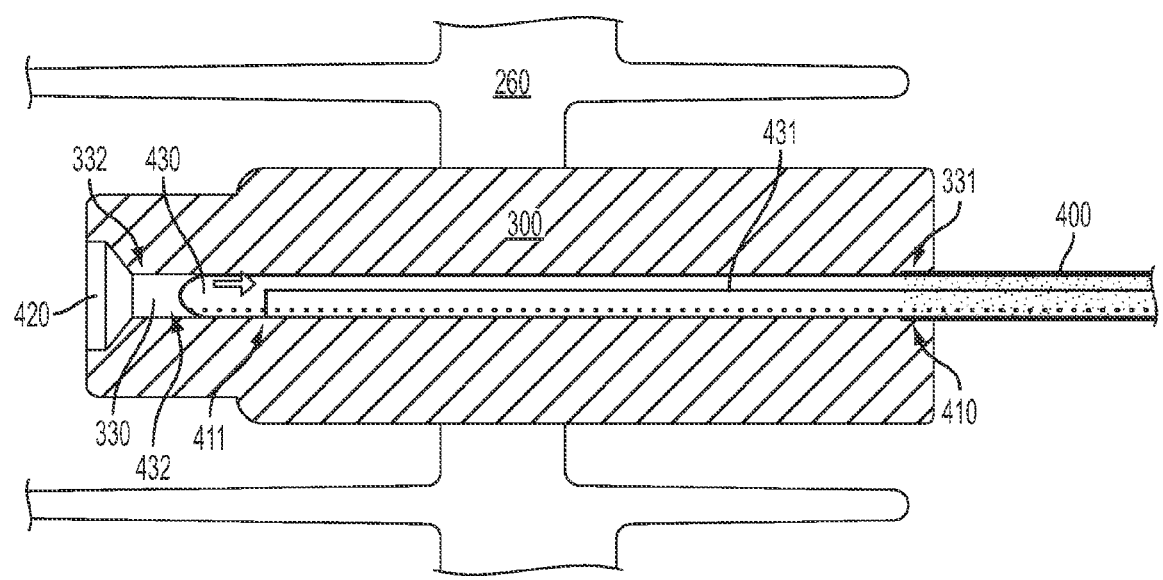
FIG. 4C is a cross-sectional elevation view of a third embodiment of a primary contact and support bushing, showing an evaporator chamber and evaporation tube, and a portion of a terminal flow separation tube.

With references to FIGS. 4A, 4B, and 4C, cross-sections of primary contact 300 fixedly seated in bushing 260 are shown for three exemplary and non-limiting embodiments of the present invention. As shown, an extension tube 400 is sealably connected to primary contact 300 at first end 331 of evaporation chamber 330. Extension tube 400 is part of the fluid conduit structure 110 that functions to extend evaporation chamber 330 through a connected bus bar (not shown). In general, extension tube 400 may be sealably connected to primary contact 300 in any manner that suitably ensures a sufficient mechanical attachment and a hermetic seal. In one embodiment, extension tube 400 is sealably connected via a thread and sealed with a metallic O-ring. As may be appreciated, extension tube 400 may be any suitable shape and made of any suitable material to accomplish its function. The use of metallic components, where appropriate, is especially advantageous (although not limiting), since metallic components generally resist the diffusion of the gaseous working fluid over time and generally have low thermal resistance. In one non-limiting embodiment, extension tube 400 is a copper or aluminum cylindrical tube.

A portion of terminal flow separation hose 410 is shown. In general, terminal flow separation hose 410 is a hose or tubing that resides within one or more fluid conduit components and functions to carry condensed (liquid) working fluid, depicted as a dotted line, toward second end 332 of evaporator chamber 330. This arrangement helps minimize a condition wherein evaporated (gaseous) working fluid, depicted as arrows, traveling upstream vigorously toward the condenser apparatus interrupts the flow of condensed (liquid) working fluid traveling downstream from the condenser apparatus toward the hot spot—a condition known as "vapor pillow formation," or counter-current flow limit. Also, terminal flow separation hose 410 helps thermally insulate the condensed working fluid such that an increased amount of condensed working fluid is delivered to the desired region or hot spot, as compared to an otherwise identical embodiment that lacks a terminal flow separation hose.

In the embodiment shown, terminal flow separation hose 410 resides within extension tube 400 and a first end 411 extends partially into evaporation chamber 330. The extent to which first end 411 extends into evaporation chamber 330 may vary from 0% to 100% depending on the desired cooling performance and the performance characteristics of the particular switchgear design in question. In one embodiment, first end 411 extends from 50% to 99% of the full distance into evaporation chamber 330. In another embodiment, first end 411 extends from 75% to 95% of the full distance into evaporation chamber 330.

The opposite end (not shown) of terminal flow separation hose 410 is connected upstream to one or more additional flow separation components of the fluid conduit structure 110 that together form a flow separation hose network, described in more detail below, which is preferably in a nested arrangement. The nested arrangement helps ensure that condensed liquid is effectively delivered to the targeted hot spot (e.g., the primary bushing interface) by decreasing vapor pillow formation and thermally insulating the condensed working fluid, as previously described. Furthermore, the nested arrangement of the flow separation network inside of the fluid conduit network reduces the number of vacuum-tight connections, thus easing the assembling and reducing cost of the system.

In the embodiment shown in FIG. 4A, evaporation chamber 330 dead-ends at second end 332. In the embodiment shown in FIGS. 4B and 4C, evaporation chamber 330 is a through-hole that is sealably closed at second end 332 by plug 420.

In one non-limiting embodiment shown in FIG. 4C, an evaporation tube 430 is inserted in evaporation chamber 330. Evaporation tube 430 has a first end 431 that is proximate first end 331 of evaporation chamber 330 and a second end 432 that approaches second end 332 of evaporation chamber 330. Second end 432 is closed. In one non-limiting embodiment, evaporation tube 430 is configured to match the interior shape of evaporation chamber 330, such that a tight fit between the two results, thereby reducing thermal resistance. In one embodiment, evaporation tube 430 is sealably attached to extension tube 400, thereby allowing for a completely sealed fluid conduit that may be filled with working fluid prior to installation into evaporation chamber 330, a condition that may assist in manufacture and assembly of switchgear 200. Generally, evaporation tube 430 is metallic. In one non-limiting embodiment, evaporation tube 430 is a copper or aluminum tube.

Figure 5:
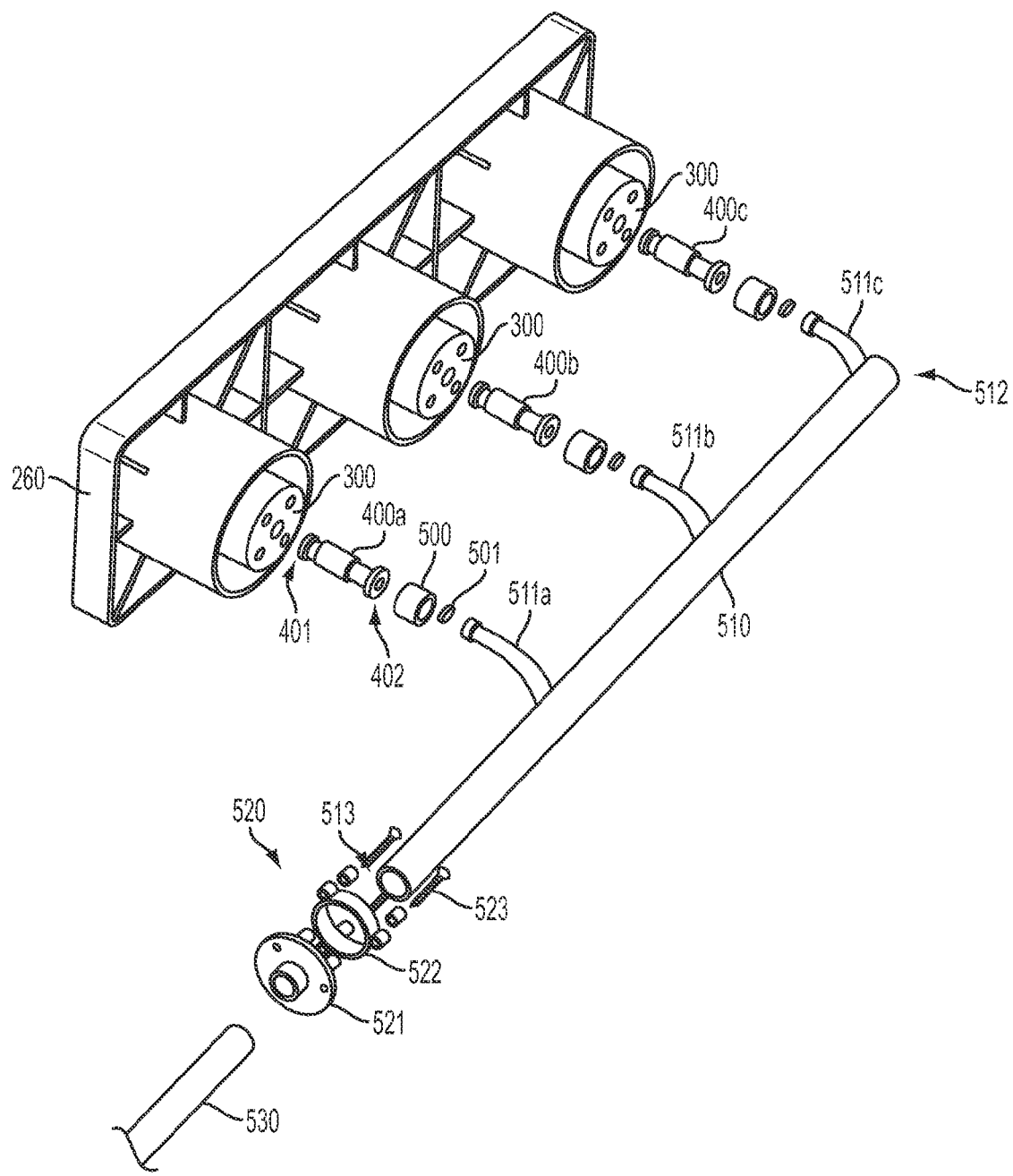
FIG. 5 is a perspective view of the bushing plate and primary contacts of FIG. 1, and an exploded view of a portion of the proximate fluid conduit components.

FIG. 5 is an exploded view of a portion of fluid conduit structure 110 of one non-limiting embodiment of the present invention, proximate bushing plate 260 and contacts 300. Each extension tube 400 of fluid conduit structure 110 has a first end 401 that is sealably affixed to primary contact 300, as previously described, and a second end 402 that is proximate branch 511 of transition tube structure 510 and sealably affixed thereto. In general, transition tube structure 510 is component of the fluid conduit structure that functions to collect the evaporated liquid of evaporators and to house flow separation hoses or other components and, in certain embodiments, equilibrium tubing (described below).

The sealed junction between second end 402 and branch 511 may be accomplished by any suitable means that ensures sufficient mechanical and sealing properties. In one embodiment, the junction is accomplished by threaded collar 500 and one or more O-ring gaskets 501. As may be appreciated, other suitable configurations are contemplated herein. In one embodiment, transition tube structure 510 does not have any branches, and extension tubes 400 are sealably attached directly to transition tube structure 510.

In one embodiment, primary contacts 300 and extension tubes 400 are at the same electrical potential, while the condenser apparatus (described below) is at a relatively low or ground electrical potential. In order to bridge the potential difference, at least one portion of the fluid conduit should be comprised of an electrically insulating material. Non-limiting examples of sufficient insulating materials are ceramic and glass materials, including glass-fiber-reinforced epoxy resin, other plastic and rubber materials, including any cast processed tubing, and the like.

In the embodiment shown in FIG. 5, transition tube structure 510 is the insulating component, and is comprised of borosilicate glass. As may be appreciated, other designs may be utilized for transition tube structure 510 and still be encompassed herein. In one non-limiting embodiment, transition tube structure 510 has an insulating portion and a conductive portion, wherein the conductive portion is located between the primary contacts and the insulating portion. In another non-limiting embodiment, transition tube structure 510 is configured to include a shield portion to lengthen creep distance. Additional exemplary configurations are detailed below in relation to FIG. 9.

In the non-limiting embodiment shown in FIG. 5, transition tube structure 510 is oriented substantially horizontally and comprises a single branched tube having a main portion with a closed first end 512 and an open second end 513. As may be appreciated, the particular orientation depends on such factors as the arrangement of primary contacts 300, which in the instant configuration are arranged horizontally in each bushing plate 260 of switchgear 200. With reference to FIG. 2, one transition tube structure is located in each of bus compartment 230 and cable compartment 240, and is associated with each bushing plate 260. In one non-limiting embodiment, transition tube structure 510 has an inner diameter between 3 mm and 50 mm; in another embodiment, between 5 mm and 30 mm.

With continued reference to FIG. 5, second end 513 is attached to condenser tubing 530 by connector assembly 520. In general, condenser tube 530 of fluid conduit structure 110 may be any conduit (hose, tubing, pipe, and the like) that connects transition tube structure 510 to the condenser apparatus (described below) while providing a sufficient vapor seal and mechanical properties under the operating conditions. In particular, condenser tubing 530, as well the other fluid conduit structure components, must be able to maintain mechanical and chemical integrity when exposed to gaseous and liquid working fluid at an elevated temperature characteristic of the working fluid under the particular operating conditions. Typical elevated temperature values range from 90 to 150° F.

Connector assembly 520 comprises collar piece 522 that wraps second end 513 of transition tube structure 510 and securely affixes second end 513 against plate 521 by means of screws 523. One or more gaskets may be used. Plate 521, in turn, is sealably and securely affixed to condenser tubing 530. As may be appreciated, other suitable means for sealably connecting transition tube structure 510 to condenser tubing 530 may be utilized, and are encompassed herein.

FIG. 6A illustrates one non-limiting embodiment of the present invention. Primary bushing plates 260a,b are shown supporting primary contacts 300 that are connected to extension tubes 400 and transition tube structures 510, all as described above. Transition tube structures 510 are shown connected to condenser tubing 530 by connector assemblies 520, as described above. In general, condenser tubing 530 extends between transition tube structures 510 and condenser apparatus 610. Condenser tubing 530 may be dimensioned and configured in any suitable manner that allows for sufficient vapor flow to condenser apparatus 610 and that accommodates the flow separation hose network, described in more detail below, which is nested therein. Non-limiting examples of suitable condenser tubing are metal tubing, including but not limited to stainless steel and aluminum bellow tubing, rubber tubing (e.g. butyl rubber), casted plastics I (e.g., epoxies), and the like. In one embodiment, condenser tubing 530 is approximately 1 inch diameter stainless steel bellows tubing.

In the embodiment shown in FIG. 6A, condenser tubing 530 has an upper portion 600 and a first end 601 that is sealably attached to condenser apparatus 610; condenser tubing 530 has a branched terminal portion 602a,b and second ends 603a,b that are sealably attached to transition tube structures 510a,b that feed bushing plates 260a,b. Any suitable means for branching condenser tubing 530 may be utilized herein, insofar as sufficient seal and mechanical properties are provided by the branching means. As may be appreciated, the particular branched configuration of condenser tubing 530 depends in part on the bushing plate design and number of primary contacts that need to be fed with working fluid.

With reference to FIGS. 6A-6D, one embodiment of a flow separation hose network of the fluid conduit structure suitable for use in the present invention is described. In general, the flow separation hose network is a nested arrangement of hoses, pipes, junctions, etc. that act as a conduit for condensed (liquid) working fluid to travel from the condenser apparatus 610 toward the hot spot (e.g., the primary bushing interface), as shown by the arrows L, and thereby help prevent pillow formation in the evaporator and provide thermal shielding that may act to lower efficiency in heat pipe apparatus. In addition, the flow separation enables a reduction in diameter of the fluid conduit network tubes (thus reduction in cost and required space), compare to a system without separation, since interaction (e.g. surface shear force) is minimized between the ascending evaporated liquid flow and the condensate return flow, a condition that would ordinarily result in a "counter current flow limit" beyond a certain heat rating where the system starts to overheat. As described above, in one or more non-limiting embodiments, a potential difference exists between the primary conductors and the condensation apparatus. In such embodiments, the flow separation hose network (in entirety or in part) is comprised of an electrically insulating material.

Enlarged sectional views of the condenser tubing 530 portions labeled "A" and "B" in FIG. 6A are illustrated in FIGS. 6B and 6C, respectively. As shown, upper flow separation hose 620 resides inside condenser tubing 530 and has a first end (not shown) that is connected to condenser apparatus 610 and is adapted to receive condensed (liquid) working fluid from condenser apparatus 610. The second end 621 of upper flow separation hose 620 is y-branched and connected to an upper fixture 631 of splitters 630. Lower fixture 632 of splitters 630 are connected to terminal flow separation hoses 410a,b. As described above, terminal flow separation hoses 410 extend through the remainder of the fluid conduit structure, in the instant embodiment, the remainder of condenser tubing 530, transition tube structures 510, and extension tubes 400. In one or more non-limiting embodiments, terminal flow separation hoses 410 are comprised of an electrically insulating polymer, such as for example a fluoropolymer, polyether ether ketone, or natural or synthetic rubber, and the like. In one non-limiting example, terminal flow separation hoses 410 have an inner diameter between 1 and 10 mm; in other embodiments, between 2 and 6 mm.

Condenser tubing 530 may have a constant radius that is large to accommodate the fluid separation components, including splitters. However, as may be appreciated, in one or more non-limiting embodiments, condenser tubing 530 may have sections or portions of differing radius, size, shape, or construction to accommodate fluid separation components of different sizes, such as splitter components.

Figure 6D:
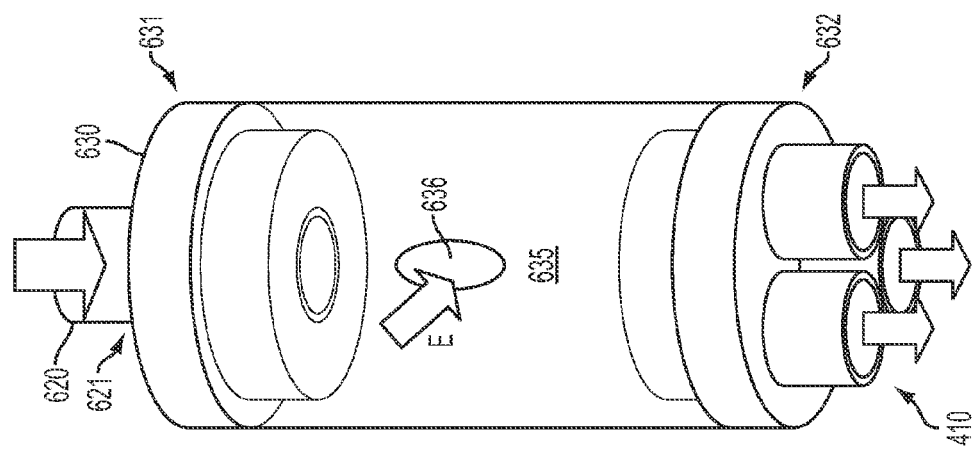
FIG. 6D is an enlarged perspective view of a splitter, having a partially transparent outer wall.

FIG. 6D shows an enlarged perspective view of one non-limiting embodiment of splitter 630 suitable for use in the present invention. In general, a splitter is any means for receiving material flowing from one or more conduits (e.g., hoses, tubes, and the like) and providing a greater number of outflow conduits downstream from the splitter, in such a manner that the material is divided among the downstream conduits in a roughly equal manner. With respect to splitter 630, upper fixture 631 affixes second end 621 of upper flow separation hose 620, and lower fixture 632 affixes upper ends of terminal flow separation hoses 410. A generally cylindrical sidewall 635 encompasses an interior cavity that allows for a roughly equal distribution of condensed working fluid received from upper flow separation hose 620. In one non-limiting embodiment, one or more openings 636 in sidewall 635 allows for inflow of working fluid that has condensed inside the fluid conduit structure 110, as depicted by arrow E.

As may be appreciated, depending on the number of desired downstream fluid flows, space constraints, etc., other splitter designs may be suitable for use herein. Also, in one alternative embodiment, the y-branch of upper flow separation hose 620 is accomplished using a splitter.

Figure 7:
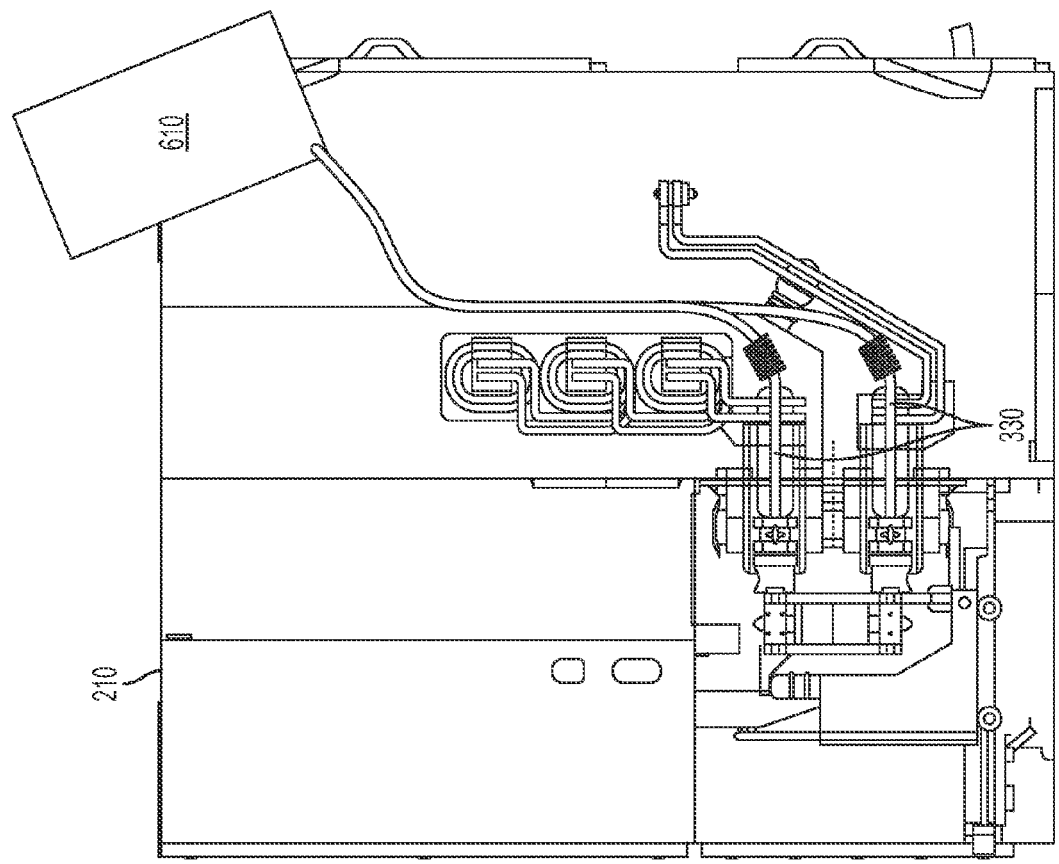
FIG. 7 is a cross-sectional elevation view of a medium voltage switchgear assembly having an evaporative cooling apparatus.

With reference to FIG. 7, a non-limiting embodiment of a condenser apparatus is described. As shown, condenser apparatus 610 is located in an elevated position in relation to evaporation chambers 330, so that condensed working fluid flows toward the evaporators passively under the influence of gravity. In particular, in the embodiment shown, condenser apparatus is mechanically affixed to the upper quadrant of one sidewall of switchgear enclosure 210. As can be appreciated, other arrangements may be suitable for use herein, such as affixing condenser apparatus 610 to the top panel of switchgear enclosure 210.

Generally any suitable condenser means is acceptable for use as the condenser apparatus herein, provided that it is configured to receive evaporated working fluid from the fluid conduit of the present invention, capable of allowing for the condensation of the working fluid, and configured to supply condensed working fluid to the nested flow separation network (e.g., via a connection to upper flow separation hose 620). Also, the condenser apparatus should be constructed to provide inner surface area for condensation that is large enough to result in a continuous phase-change flow and outer surface area that is large enough to result in sufficient heat removal by natural air flow (in the case of a passive condenser) or by forced air flow (in the case of an assisted system). In one or more non-limiting embodiments, the outer surface is coated to enhance radiant heat emission, and the inner surface is coated or treated mechanically or chemically to enhance condensation efficiency.

Non-limiting examples of suitable condenser apparatus include passive or forced air cooled radiator-type or finned heat exchangers. In one non-limiting embodiment, condenser apparatus 610 is a finned heat exchanger with forced air cooling, by one or more fans. In another non-limiting example, the outer surface of condenser apparatus 610 is coated to enhance radiant heat release, and the inner surface is treated to enhance condensation efficiency. In operation, the condenser apparatus is typically kept to a temperature at or below 158° F. (70° C.), to effect suitably rapid condensation.

In operation, the working fluid is recirculated through the evaporative cooling system and the hot spots are cooled in the following manner. First, terminal flow separation hoses 410 carry an amount of condensed (liquid) working fluid to the evaporators (e.g., evaporator chambers 330), where working fluid is evaporated. In the process of evaporation, heat is drawn from the current conductor (e.g., primary contacts 300), thereby allowing for higher current ratings, as compared to a control lacking the cooling system. The evaporated (vapor) working fluid thereafter travels upstream through the fluid conduit structure to the condenser apparatus—represented by small arrows in FIGS. 4A-C and by arrows G in FIGS. 6B and 6C. Thereafter, while a portion of the evaporated working fluid may condense in the fluid conduit itself, the majority condenses in the condenser apparatus. Condensation of the working fluid is accompanied by the emission of condensation heat. As a result of gravity, the working fluid that is condensed in the condenser apparatus flows passively back toward the evaporators through the nested flow separation hose network, which terminates in terminal flow separation hoses 410, completing the recirculation loop.

In the embodiments shown in, e.g., FIGS. 5 and 6, the flow of condensed working fluid from the condenser is split in the nested flow separation network, first in two and afterwards into three streams—one for each evaporator (e.g., evaporator chambers 330) of each bushing plate 260. The splitters should preferably hang inside the fluid conduit structure 110 (e.g., condensate tubing 530 thereof) above the stand-by liquid level (the level of liquid in a heat pipe when no boiling occurs), but within the vapor flow.

If the cooling system is intended to form an electrical isolation gap, an electrically insulating working fluid needs to be provided. Non-limiting examples of suitable working fluids are refrigerants such as hydrofluorocarbons (e.g. R134a, R245fa), fluorketones (e.g., NOVEC-649™, commercially available from 3M), and hydrofluoroethers (e.g., HFE-7100™, commercially available from 3M).

Figure 8:
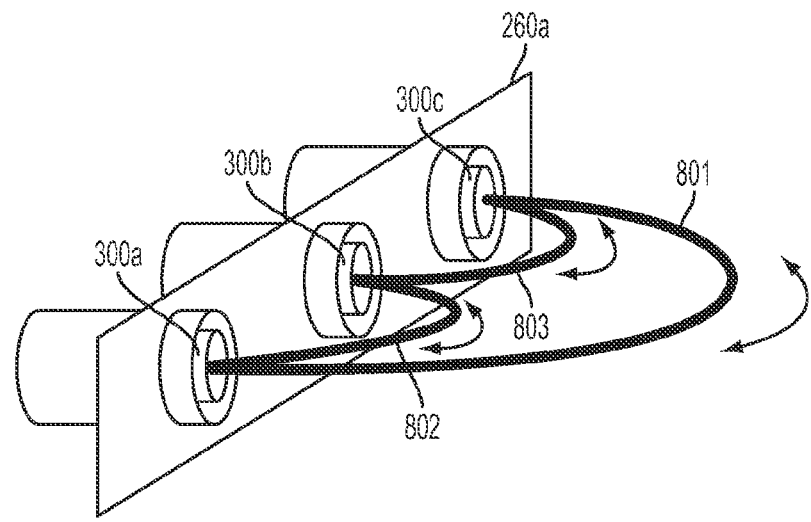
FIG. 8 is a perspective view of a bushing plate and primary contacts, showing one embodiment of an equilibrium tubing configuration.
Figure 9A:
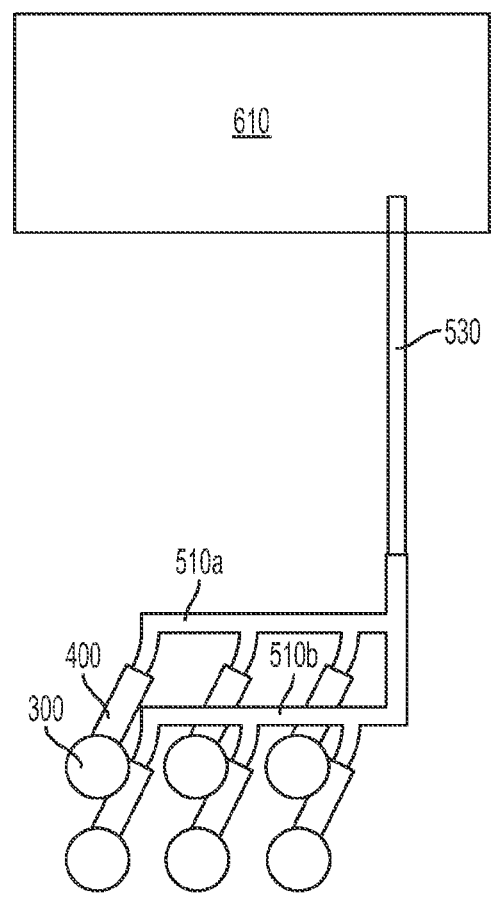
FIGS. 9A-9D are schematics illustrating four non-limiting embodiments of evaporative cooling systems described herein.
Figure 9D:
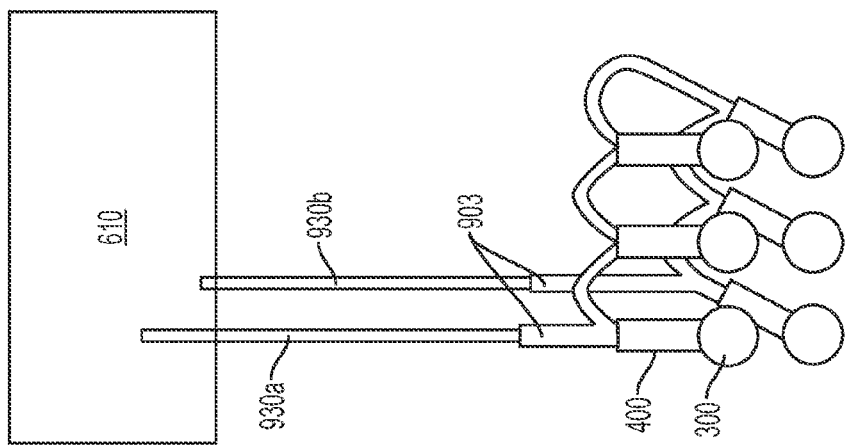
Figure 9C:
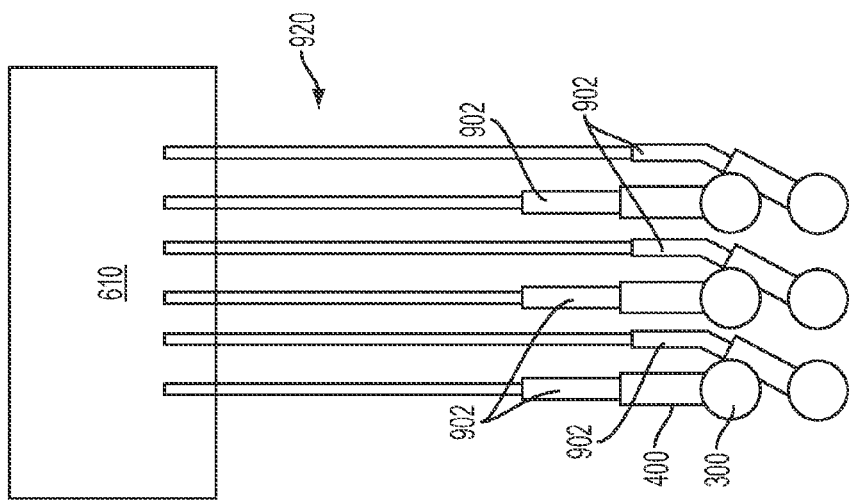
Figure 9B:
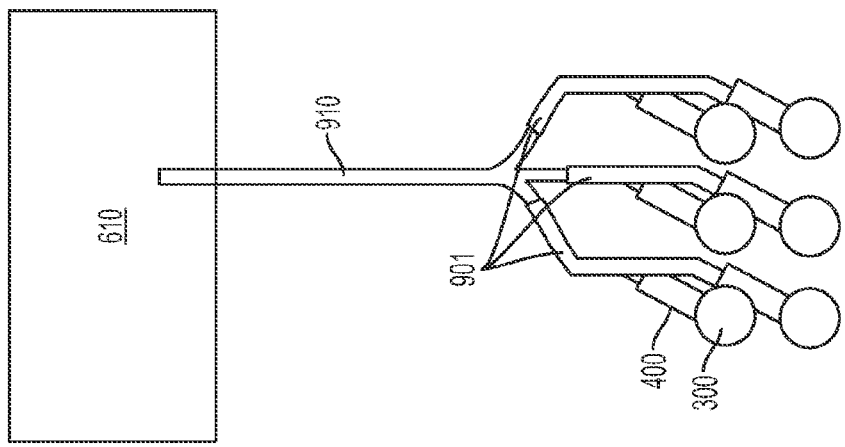

In one or more non-limiting embodiments, an equilibrium network is provided in the cooling system of the present invention. In general, an equilibrium network denotes one or more conduits, hoses, or tubes that are connected in such a manner to provide a channel for liquid to flow, via capillary action or otherwise, between each primary contact evaporator (e.g., evaporator chambers 330). With reference to FIG. 8, bushing plate 260a is shown supporting primary contacts 300a-c. An exemplary equilibrium network comprises a first hose 801 having first and second ends partially extending into the evaporative chambers of primary contacts 300a and 300c, respectively; a second hose 802 having first and second ends partially extending into the evaporative chambers of primary contacts 300a and 300b, respectively; and a third hose 803 having first and second ends partially extending into the evaporative chambers of primary contacts 300b and 300c, respectively. The equilibrium hoses are located within the existing fluid conduit components—i.e., extension tubes 400 (not shown) and transfer tube 510 (not shown). It is believed that providing an equilibrium network increases performance by reducing cooling differentials in primary contacts across a bushing plate.

With reference to FIG. 9, non-limiting examples of alternative fluid conduit structure arrangements are illustrated. FIG. 9A illustrates an arrangement described above, in which the fluid conduit structure is characterized by, e.g., extension tubes 400 extending from each evaporator in each primary contact 300; with the transition tube structure including horizontal transition tubes 510 connected to each extension tube 400 of each bushing plate (not shown) and linking each evaporator to a single condenser tube 530 defining condenser tube structure, which is connected to a condenser 610. In the alternative embodiment illustrated in FIG. 9B, the transition tube structure includes three vertical transition tubes 901 that replace the two horizontal transition tubes 510, and link each evaporator to the branched end of a single condenser tube 910 defining the condenser tube structure, which is connected to condenser 610. In the embodiment illustrated in FIG. 9C, the transition tube structure includes six individual transition tubes 902 that are separately connected at their first end to an extension tube 400, and connected at their second end to a separate condenser tube 920, each of which defines the condenser tube structure and is connected to condenser 610. In the embodiment illustrated in FIG. 9D, the transition tube structure includes transition tubes 903 that are linked serially, and a single condenser tube 930a,b for each bushing plate is thereafter connected to condenser 610. As may be appreciated, other configurations of fluid conduit and/or nested flow separation tubing may be suitable for use herein. In FIGS. 9B to 9D, the tubes 901, 902 and 903 are electrically insulating tubing sections made, for example, of epoxy, ceramic, glass, rubber or polymer.

Figure 10:
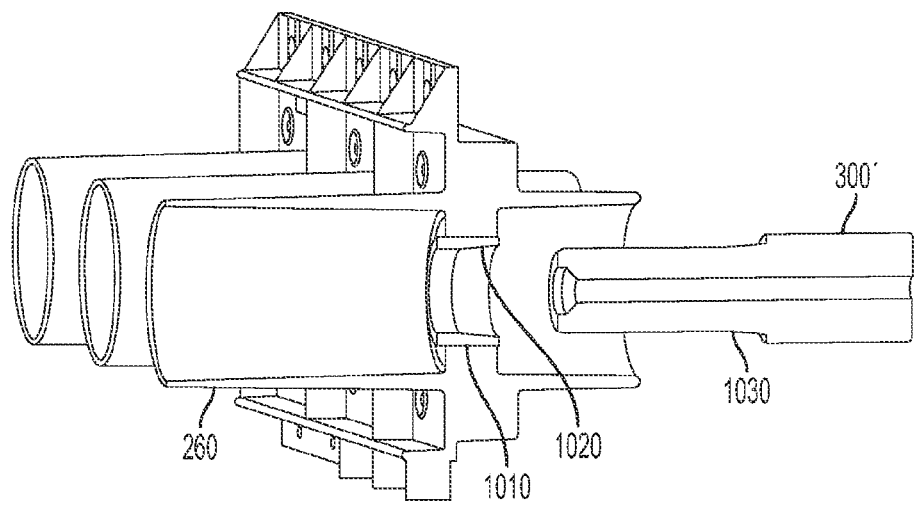
FIG. 10 is a cross-sectional view of mounting structure fixed to a bushing plate for removably coupling a primary contact.

With reference to FIG. 3A, typically, the primary contacts 300 are fixed in a casted arrangement with the bushing plate 260. As a result, a possible correction of defects of the heat pipe 100 (e.g., lack of sufficient leak tightness) requires a substantial disassembly of the switchgear product, with leak tests as part of the installation/service procedure. Thus, it is preferable to build the heat pipe 100 separate from the manufacturing of the switchgear product for testing prior to assembly into the switchgear product. In that regard, and with reference to FIG. 10, a mounting structure 1010 is securely fixed, by inset molding or the like, to the bushing plate 260. In the embodiment, the mounting structure 1010 is a metal ring having an conical or tapering interior surface 1020. The associated primary contact 300' has an conical or tapering outer surface 1030 that frictionally and removably engages with the interior surface 1020 to secure the primary contact 300' with respect to the bushing plate 260. Thus, the heat pipe assembly (including the primary contact 300' having the evaporator 120, the fluid conduit structure 110 and the condenser apparatus 130) remains an integral part of the switchgear electrical current path with optimal proximity to thermal losses, but is advantageously removable. The switchgear can now be manufactured separately from the heat pipe assembly. Therefore, the heat pipe assembly can be fully and assembled and tested in a dedicated testing facility prior to being assembled into the switchgear. In addition, to service the heat pipe assembly after it is assembled into the switchgear, the heat pipe assembly can be easily removed from the switchgear.

Figure 11A:
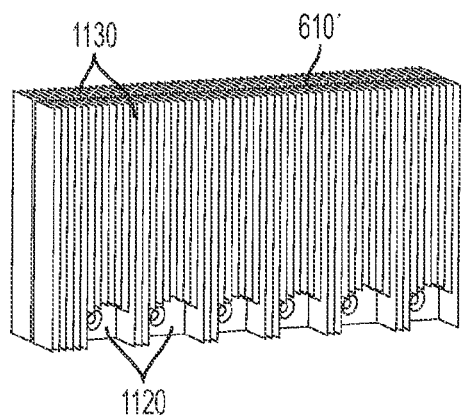
FIG. 11A is a view of a condenser having six individual chambers.
Figure 11B:
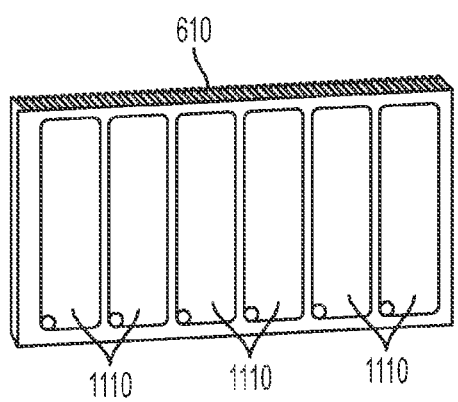
FIG. 11B is a cross-sectional view of the condenser of FIG. 11A.

As noted above, FIG. 9C shows a plurality of condenser tubes 920 fluidly coupled to a common condenser apparatus 610. However, with reference to FIGS. 11A, 11B, the condenser apparatus 610' can have an independent and sealed chamber 1110 associated with each condenser tube 920 (FIG. 9C) so that the six thermosiphons are operated independently. A condenser tube 920 (not shown in FIG. 11A, 11B) is connected to the bottom 1120 of each chamber 1110. The chambers 1110 are provided between two finned, eroded plates 1130 which are welded around the periphery thereof. Alternatively, each condenser tube 920 can be coupled to a separate condenser apparatus, but such an arrangement would increases cost.

In the embodiments, the primary contacts 300' can be made of aluminum, since the need of enhanced thermal conduction for the sake of temperature reduction is no longer needed due to the provision of the heat pipe 100.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A cooling apparatus for a switchgear, the switchgear having one or more primary contacts supported by a bushing plate and constructed and arranged to connect to a terminal of a circuit breaker, the cooling apparatus comprising:
   at least one evaporator constructed and arranged to be associated with each primary contact,
   a condenser apparatus located at a higher elevation than the at least one evaporator,
   fluid conduit structure connecting the at least one evaporator with the condenser apparatus, and
   electrically insulating working fluid in the at least one evaporator so as to be heated to a vapor state, with the fluid conduit structure being constructed and arranged to transfer the vapor to the condenser apparatus and to passively return condensed working fluid back to the at least one evaporator, thereby removing heat from the one or more primary contacts via the at least one evaporator without the aid of a forced-air fan.

2. The apparatus of claim 1, wherein at least a portion of the fluid conduit structure is electrically insulating.

3. The apparatus of claim 2, wherein the working fluid is selected from the group consisting of hydrofluorocarbon, fluoroketone, and hydrofluoroether refrigerants, and any mixtures thereof.

4. The apparatus of claim 1, wherein the at least one evaporator is constructed and arranged to be mechanically connected externally to the one or more primary contacts.

5. The apparatus of claim 1, in combination with the one or more primary contacts and the bushing plate, each primary contact being removably coupled to the bushing plate.

6. The combination of claim 5, wherein a mounting structure is fixed to the bushing plate and engages a portion of an associated primary contact in a removable manner.

7. The combination of claim 6, wherein the mounting structure comprises a metal ring having a generally conical interior surface and the associated primary contact has a generally conical outer surface that removably engages with the interior surface.

8. The apparatus of claim 1, wherein the condenser apparatus is a finned heat exchanger that is passively air-cooled.

9. A cooling apparatus for a switchgear, the switchgear having one or more primary contacts supported by a bushing plate and constructed and arranged to connect to a terminal of a circuit breaker, the cooling apparatus comprising:
    at least one evaporator constructed and arranged to be associated with each primary contact,
    a condenser apparatus located at a higher elevation than the at least one evaporator,
    fluid conduit structure connecting the at least one evaporator with the condenser apparatus, and
    electrically insulating working fluid in the at least one evaporator so as to be heated to a vapor state, with the fluid conduit structure being constructed and arranged to transfer the vapor to the condenser apparatus and to passively return condensed working fluid back to the at least one evaporator,
    the cooling apparatus being in combination with a plurality of primary contacts, wherein each evaporator comprises an evaporation chamber formed in an associated primary contact.

10. The combination of claim 9, wherein each evaporation chamber has a closed first end proximate the circuit breaker and an opened end opposite the closed end, the fluid conduit structure being coupled to the opened end.

11. The combination of claim 9, wherein the fluid conduit structure comprises:
    an extension tube having a first end coupled to an associated primary contact and in communication with the evaporation chamber thereof,
    condenser tube structure connected to the condenser, and
    transition tube structure connecting the extension tubes to the condenser tube structure.

12. The combination of claim 11, wherein the transition tube structure is includes an electrically insulating material.

13. The combination of claim 12, wherein the insulating material is borosilicate glass or epoxy resin.

14. The combination of claim 11, wherein the condenser tube structure comprises a single condenser tube having a first end coupled to the condenser apparatus, and the transition tube structure comprises a transition tube connected to an associated extension tube and to a second end of the single condenser tube.

15. The combination of claim 14, wherein the second end of the single condenser tube is a branched end coupled with each transition tube.

16. The combination of claim 11, wherein the condenser tube structure comprises a plurality of condenser tubes each having a first end coupled to the condenser apparatus, and wherein the transition tube structure comprises a plurality of transition tubes, each transition tube being coupled to an associated extension tube and to a second end of an associated condenser tube.

17. The combination of claim 16, wherein the transition tube structure is includes an electrically insulating material.

18. The combination of claim 16, wherein the condenser apparatus includes a plurality of independent and sealed chambers disposed between two finned plates, the first end of each condenser tube being in fluid communication with an associated sealed chamber.

19. The combination of claim 9, further comprising a flow separation hose network nested inside the fluid conduit structure, the flow separation hose network being constructed and arranged to return the condensed working fluid back to the evaporation chambers.

20. The combination of claim 19, wherein flow separation hose network includes a hose having an end extending inside of each evaporator chamber a distance between 50% and 99% of the entire interior lateral distance of the evaporation chamber.

21. The combination of claim 19, wherein the flow separation hose network includes hoses comprised of an electrically insulating polymer selected from the group consisting of fluoropolymers, polyether ether ketone, natural rubber, synthetic rubber, and any combination thereof.

22. The combination of claim 19, wherein the flow separation hose network includes a splitter having a first end with a single input to receive the condensed working fluid from the condenser apparatus and a second end having a plurality of outputs for returning the condensed working fluid to the evaporation chambers.

23. The combination of claim 22, wherein the splitter includes at least one opening to permit inflow of working fluid that condensates inside the fluid conduit structure.

24. The combination of claim 9, wherein at least some of said evaporation chambers are in fluid communication with each other.

25. A method of cooling a switchgear having primary contacts constructed and arranged to connect to a terminal of a circuit breaker, the method comprising the steps of:
    associating an evaporator with each primary contact,
    providing a condenser located at a higher elevation than each evaporator, fluid conduit structure fluidly connecting the evaporators with the condenser, and a working fluid in the evaporators,
    transferring heat from the primary contacts to the working fluid to cause the working fluid to evaporate in the evaporators with the evaporated vapor being delivered to the condenser via the fluid conduit structure, and
    passively returning the working fluid that condenses in the condenser to the evaporators via the fluid conduit structure,
    wherein the associating step includes defining each evaporator as an evaporation chamber within each primary contact.

26. The method of claim 25, wherein the working fluid is provided as an electrically insulating working fluid and the fluid conduit structure includes at least a portion that is electrically insulating.

* * * * *

UNITED STATES PATENT AND TRADEMARK OFFICE
CERTIFICATE OF CORRECTION

| | | |
|---|---|---|
| PATENT NO. | : 8,695,358 B2 | Page 1 of 1 |
| APPLICATION NO. | : 13/444888 | |
| DATED | : April 15, 2014 | |
| INVENTOR(S) | : Kaufmann et al. | |

It is certified that error appears in the above-identified patent and that said Letters Patent is hereby corrected as shown below:

On the Title Page item (75), delete "Harshavardhan M. Karankikar" and insert -- Harshavardhan M. Karandikar --.

Signed and Sealed this
Fifteenth Day of July, 2014

Michelle K. Lee
*Deputy Director of the United States Patent and Trademark Office*